June 21, 1960     W. R. LEISCHER     2,941,496
BOOM ANGLE INDICATOR FOR EXCAVATING MACHINES
Filed Oct. 20, 1958                              2 Sheets-Sheet 1

INVENTOR
WESLEY R. LEISCHER
BY *Wright & Wright*
ATTORNEYS

June 21, 1960  W. R. LEISCHER  2,941,496
BOOM ANGLE INDICATOR FOR EXCAVATING MACHINES
Filed Oct. 20, 1958  2 Sheets-Sheet 2
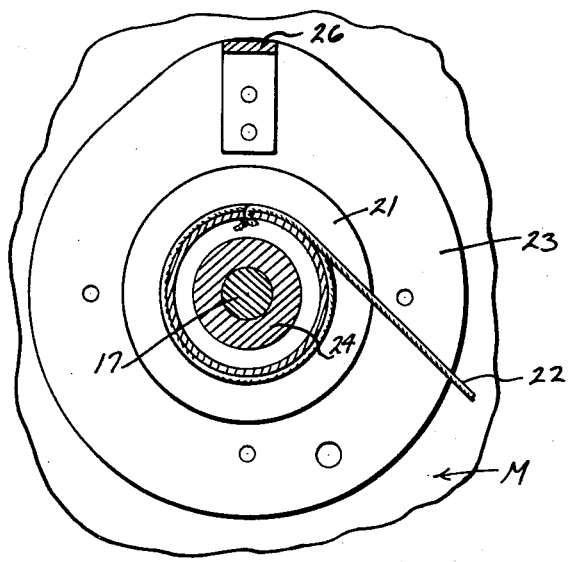
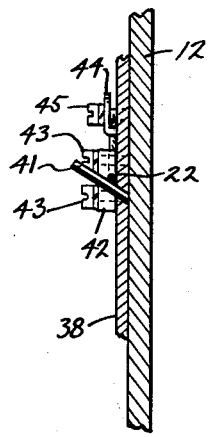
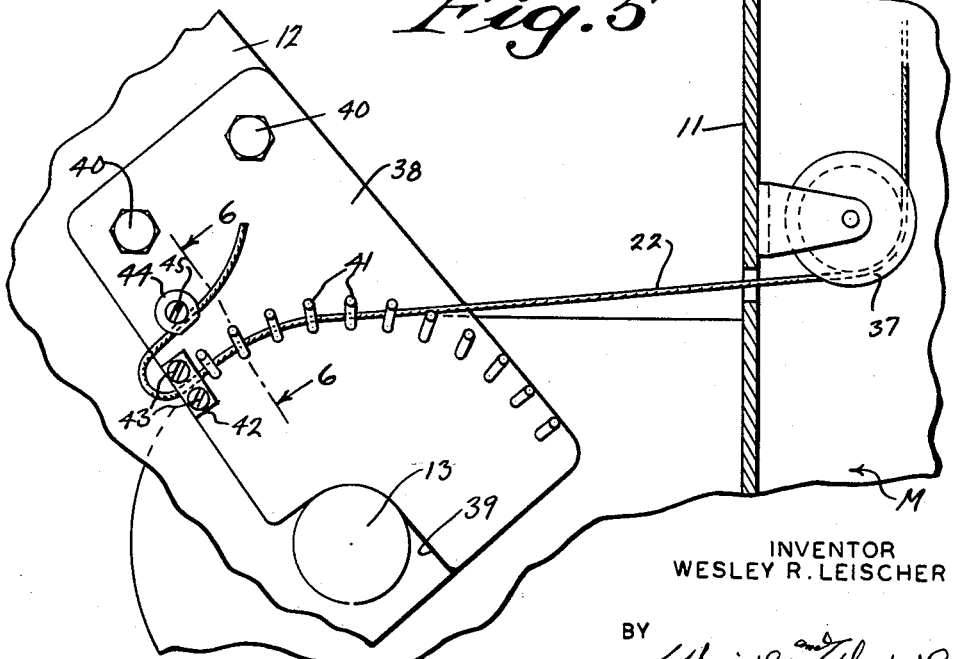
INVENTOR
WESLEY R. LEISCHER
BY *Wright and Wright*
ATTORNEYS

United States Patent Office 2,941,496
Patented June 21, 1960

2,941,496

BOOM ANGLE INDICATOR FOR EXCAVATING MACHINES

Wesley R. Leischer, 128 Lounsberry St., Watertown, Wis.

Filed Oct. 20, 1958, Ser. No. 768,366

3 Claims. (Cl. 116—124)

This invention appertains to machines of the type embodying a frame, a cab and a swinging boom, such as excavating machines, cranes and the like, and more particularly to means for indicating to the operator of the machine sitting in the cab, the exact angle of the boom relative to the frame.

In excavating machines, the boom is usually working between two angles, namely, the loading or excavating angle and the raised dumping angle. These two angles vary according to the position of the machine relative to the excavation and a dump truck. With the two angles known, for a certain job, it is often extremely desirable to return the boom to the exact working angle and it is of great help to the operator to know when the boom reaches the desired dumping angle.

It is, therefore, one of the primary objects of my invention to provide novel means located in the cab including a stationary pointer and a rotatable graduated dial operatively connected to the boom for indicating to the operator in the cab, the exact boom angle.

Another salient object of my invention is to provide a pair of indicating pointers or arrows rotatable with the dial relative to the stationary pointer, but independently adjustable manually, so that the movable pointers can be set relative to the stationary pointer for indicating the desired working limits of the boom.

A further important object of my invention is to provide a novel boom angle indicator comprising a rotatable spring loaded housing including a dial and a spool supported in a novel manner on a plate having a supporting shaft on which the hub of the housing rotates, and a stationary pointer overhanging the dial with an operating cable connected to the boom and wound upon the spool for turning the housing upon operation of the boom in one direction, the spring tending to return the dial to a normal position upon movement of the boom in the opposite direction.

A still further object of my invention is to provide novel guide means for the operating cable and novel means for connecting the cable to the boom.

A still further important object of my invention is to provide a boom angle indicator for excavating machines and the like which will be of an exceptionally simple and durable construction, one that will be easy to manufacture and one which can be incorporated with excavating and like machines without any change to the existing mechanism thereof.

With these and other objects in view, the invention consists in the novel construction, arrangement and formation of parts, as will be hereinafter more specifically described and claimed, and illustrated in the accompanying drawings, in which drawings, Figure 1 is a fragmentary side elevational view of an excavating machine with parts thereof broken away and in section, showing my improved boom angle indicator connected therewith;

Figure 4 is a detail vertical sectional view taken at right angles to Figure 3, and on the line 4—4 of Figure 3, looking in the direction of the arrows;

Figure 5 is a fragmentary side elevational view partly in section illustrating the means of connecting the operating cable with the boom, the view also showing the novel guide means for the cable, and Figure 6 is a detail sectional view taken on the line 6—6 of Figure 5, looking in the direction of the arrows, showing the means of securing the cable to the boom.

Referring to the drawings in detail, wherein similar reference characters designate corresponding parts throughout the several views, the letter M generally indicates an excavating or like machine with my improved boom angle indicating mechanism I connected therewith.

Figure 1:
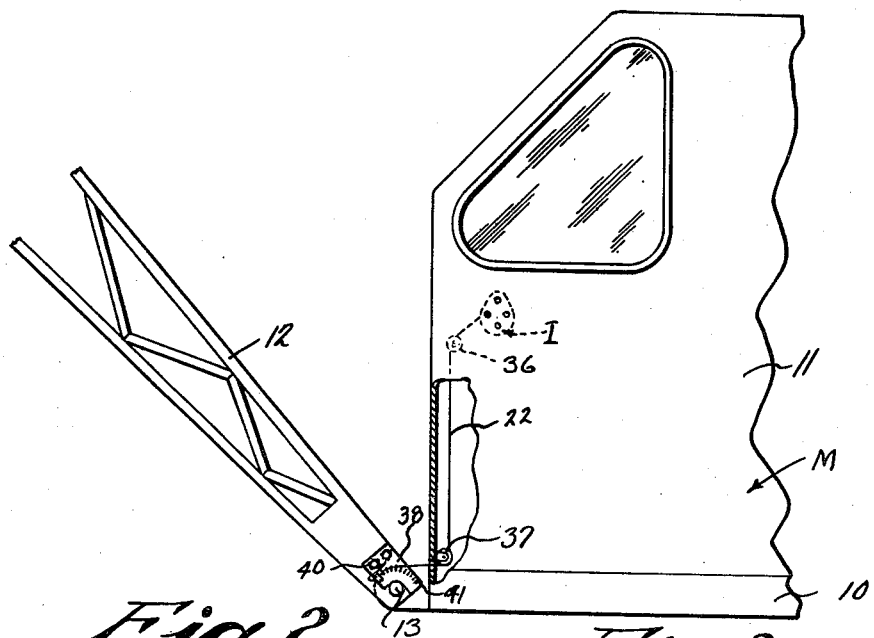
Figure 2:
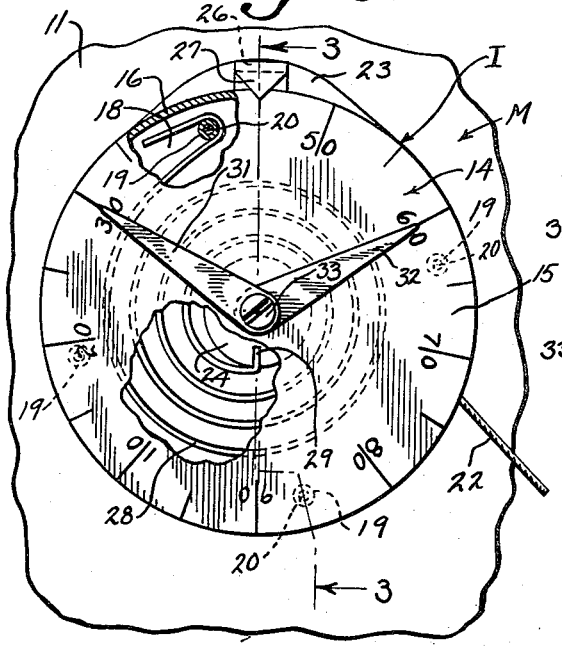
Figure 2 is an enlarged detail side elevational view of a cab wall showing my novel indicating mechanism incorporated therewith, parts of the mechanism being shown broken away and in section to illustrate structural detail.
Figure 3:
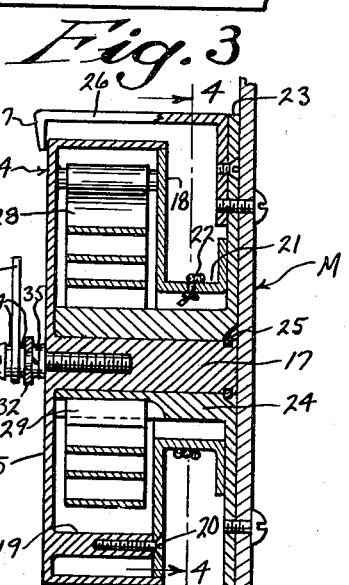
Figure 3 is a detail vertical sectional view taken on the line 3—3 of Figure 2, looking in the direction of the arrows, illustrating the novel construction of the dial housing and its supporting means.

The excavating machine M is of any well known design and will not be described in detail, but the same includes a frame 10 supporting a cab 11 and a boom 12. The boom is supported by the frame 10 for swinging movement on a shaft or foot pin 13.

My novel boom indicator I includes a dial mechanism located at a convenient point in the cab 11 and the same includes a rotatable housing 14. This housing 14 includes a front dial plate 15 graduated in degrees of a circle and has formed on its periphery an inwardly extending annular side wall 16. The center of the dial plate has formed thereon or secured thereto a hub 17. Also forming a part of the housing is a rear wall 18, which is detachably secured in place. The same can be secured in place in any desired way, such as by the forming of lugs 19 on the inner surface of the dial plate 15 and threading screws 20 through the rear wall into the lugs. The lugs also form spacers to properly position the rear wall relative to the dial. The rear wall has formed on its axial center a hollow spool 21 around which is coiled and secured an operating cable 22, the purpose of which will later appear.

The housing and spool are carried by a mounting plate 23 having formed thereon or secured thereto a hollow shaft 24 which extends axially within the housing 14. The hub 17 of the housing extends within this hollow shaft and is rotatably supported thereby. Accidental withdrawal of the housing from the hollow shaft 24 is prevented by a ring 25 which is snapped into an annular groove formed in the hub 17. The mounting plate 23 has secured thereto a stationary indicator 26 and this indicator terminates in a pointer 27 which overhangs the periphery of the dial 15 and this pointer cooperates with the degree scale on the dial.

The mounting plate in turn is securely fastened to a wall of the cab 11 at a convenient point to be easily read by the operator. As illustrated in Figure 1, the dial mechanism is secured to the side wall of the cab adjacent to the front of the cab and at one side of the controls (not shown).

The housing is spring loaded so that the same will tend to return to a selected normal position when the same is rotated by a pull on the cable 22. Thus, a spiral spring 28 is placed within the housing and the inner wall of the spring is anchored, as at 29, to the hollow shaft 24 and the outer end of the spring is secured to one of the lugs 19 carried by the housing.

Cooperating with the dial 15 and normally movable with the dial and the housing are a pair of independent indicating pointers or arrows 31 and 32. These indicating pointers 31 and 32 are mounted upon a headed screw 33 threaded into the axial center of the hub 17. Wear washers 34 are placed on the screw between the pointers and the head of the screw and a split lock washer 35 is also placed on the screw to provide a resilient friction means for holding the pointers in a desired set adjusted position. In actual practice the screw 33 is threaded tightly into the hub 17 and the pointers 31 and 32 can be forcibly and manually moved to a desired adjusted position, as will be further set forth.

The cable 22 is led down and over suitable idle pulleys 36 and 37 and out of the front of the cab to a point adjacent to the pivoted end of the boom 12.

Forming an important feature of the invention is the provision of means for operatively connecting the forward end of the cable 22 with the boom. This means includes a bracket plate 38 having its inner lower corner cut away as at 39, so that the bracket plate can extend around the shaft 13 of the boom 12. The plate is secured to the side of the boom by the use of suitable machine screws 40. Secured to the bracket plate 38 is a series of guide pegs 41 arranged in an arc of a circle having as its axis the pivot shaft 13 and the cable 22 is guided over these pegs. The front end of the cable is secured to the plate by means of clamping jaw plates 42 and the clamping jaw plates 42 are held on the bracket plate 38 and in gripping engagement with the cab by screws 43. The cable is also preferably further held securely to the bracket plate 38 by a second clamp washer 44 and this washer is in turn secured to the bracket plate 38 by a screw 45.

In operation of my novel device, the dial and its housing is connected to the cab 11 and the cable is led out of the cab and secured to the boom as just described. The spring 28 is wound to the desired tension so that the dial will always tend to return to a certain position relative to the stationary pointer 27. The operating angles of the boom 12 are now determined and the movable pointers 31 and 32 are manually adjusted to these working angles. Upon the lowering of the boom 12 to its excavating or loading angle, the cable 22 will be pulled and the dial and its housing will be rotated against tension of the spring 28. When the excavating angle is reached, as shown by the pointer 31 the operator stops the boom and when the bucket or scraper is loaded (bucket not shown), then the operator raises the boom 12 and the dial will rotate under the influence of its spring until the pointer 32 reaches the stationary pointer 27 at which time further raising of the boom is stopped.

From the foregoing description, it can be seen that I have provided an exceptionally simple and durable mechanism for effectively indicating the desired working angles of the boom of an excavating or like machine.

Great stress is laid on the use of the pegs 41 for the cable 22. The pegs provide spaces between themselves and hence the pegs are self-cleaning and will not become clogged by dirt and the like.

Various changes in details may be made without departing from the spirit or the scope of this invention, but what I claim as new is:

1. In an excavating machine or the like including a frame, a cab and a boom pivoted to the frame for swinging movement in a vertical plane; means for indicating to the operator of the boom in the cab the angle of the boom relative to the frame including a spring loaded rotatable dial graduated in degrees of a circle, a stationary pointer cooperating with the graduations, a spool rotatable with the dial, a pull cable wound upon the spool, said cable being guided out of the cab adjacent to the pivot point of the boom, means securing the forward end of the cable to the boom and an arcuate guide for the cable secured to the boom, the guide being struck on an arc of a circle having its axis the pivot point of the boom, the cable being pulled by the boom when the boom is swung in one direction against the tension of the spring, the spring tending to return the dial to a predetermined position relative to the stationary pointer, said dial and spool being mounted on a wall of the cab, and a pair of independently manually adjustable pointers normally rotatable with the dial and adjustable to a predetermined position relative to the stationary pointer for indicating the extreme working angles of the boom under certain working conditions.

2. In an excavating or like machine including a frame, a cab and a boom pivoted to the frame for swinging movement in a vertical plane; means for indicating the angle of the boom relative to the frame to the operator in the cab including a rotatable housing having a dial plate graduated in degrees of a circle, an annular side wall, a rear wall and a spool carried by said rear wall, said dial plate having an axially disposed hub, a mounting plate secured to the inner surface of the wall of the cab and including a hollow shaft rotatably receiving the hub, a tension spring coiled within the housing and having its inner end secured to the hollow shaft and its outer end secured to the housing, a stationary indicator carried by the mounting plate and extending over the dial for cooperation with the graduations thereon, a cable secured to the spool and wound thereon and extending out of the cab to the boom adjacent to the pivot point thereof, means securing the outer end of the cable to the boom, an arcuate guide for the cable carried by the boom concentric with the axis of the pivot of the boom, the housing and its dial plate being rotated relative to the stationary indicator upon pull on the cable through movement of the boom in one direction against the tension of the spring, and manually adjustable pointers carried by the axial center of the dial plate adapted to be set relative to the stationary pointer and on the dial plate to indicate working limits of the boom.

3. In an excavating or like machine including a frame, a cab and a boom pivoted to the frame for swinging movement in a vertical plane, means indicating the angle of the boom relative to the frame to the operator in the cab as defined in claim 2, and said arcuate guide for the cable including a plurality of spaced pegs projecting laterally from the boom.

References Cited in the file of this patent
UNITED STATES PATENTS

| | | |
|---|---|---|
| 1,773,589 | Lichtenberg | Aug. 19, 1930 |
| 2,374,298 | Nasset | Apr. 24, 1945 |